J. F. TURNER.
Weeding Implement.
No. 203,798. Patented May 14, 1878.
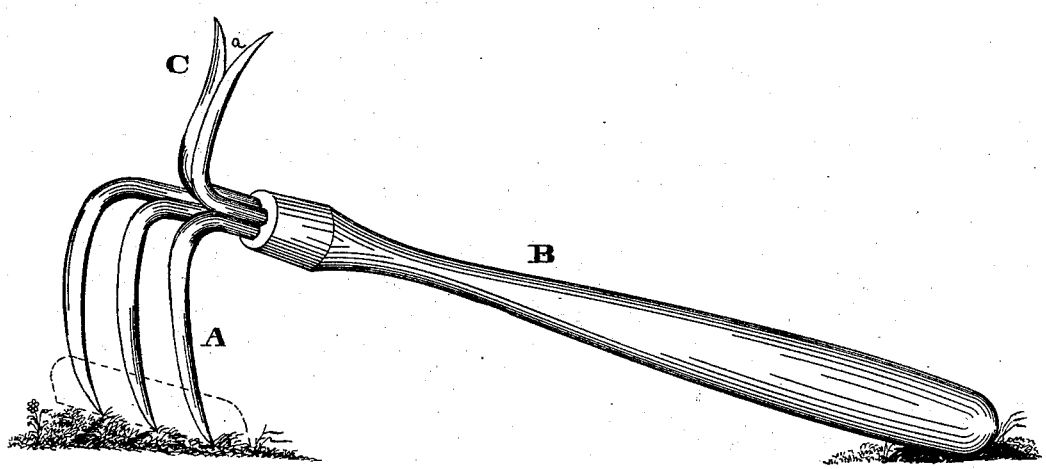
Witnesses:
A. P. Grant,
W. F. Kircher
Inventor:
John F. Turner,
by John A. Wiedersheim
ATTORNEY.

UNITED STATES PATENT OFFICE.

JOHN F. TURNER, OF PHILADELPHIA, PENNSYLVANIA.

IMPROVEMENT IN WEEDING IMPLEMENTS.

Specification forming part of Letters Patent No. 203,798, dated May 14, 1878; application filed March 30, 1878.

*To all whom it may concern:*

Be it known that I, JOHN F. TURNER, of the city and county of Philadelphia, and State of Pennsylvania, have invented a new and useful Improvement in Weeding Implements, which improvement is fully set forth in the following specification and accompanying drawing, in which the figure is a perspective view.

My invention consists of a claw formed of wire, for readily pulling or removing weeds, grass, &c., without cutting them.

It further consists of means for loosening the earth and weeds, and pulling or removing the latter.

Referring to the drawing, A represents a number of teeth secured to a handle, B, and adapted for breaking the earth around the weeds and loosening the latter. In lieu of the teeth, I may employ a number of arms, having a cutting-blade at their lower ends, the object whereof is similar to the teeth.

C represents a claw or fork, whose shank or tang is secured to the handle B, the claw being curved rearward or toward the handle, and formed of two pieces of wire, so that the inner faces $a$ of the claw are rounded.

When weeds, grass, &c., are to be pulled or removed, the claw is brought thereagainst, and the handle drawn toward the operator, so as to embrace the weeds, &c., either in the body, blade, or stalk, or at the base thereof, the result whereof is evident. Should the weeds, grass, &c., be difficult of removal, the handle may be raised so that the claw turns on its outer curved face, the leverage thus exerted quickly overcoming the resistance of the weeds, &c.; but in every operation the rounded faces of the claw take hold of the weeds, &c., without cutting them.

Having thus described my invention, what I claim as new, and desire to secure by Letters Patent, is—

1. The pulling-claw C, formed of wire, and having its inner faces rounded, substantially as and for the purpose set forth.

2. In combination with the pulling-claw C, constructed as described, the loosening teeth or blade A, substantially as and for the purpose set forth.

JOHN F. TURNER.

Witnesses:
 DAVID McDANIEL,
 JOHN A. WIEDERSHEIM.